(12) United States Patent
Walker

(10) Patent No.: US 7,895,357 B1
(45) Date of Patent: Feb. 22, 2011

(54) INVOICE MEDIATION SYSTEM AND METHOD

(75) Inventor: Joel M. Walker, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1667 days.

(21) Appl. No.: 10/781,396

(22) Filed: Feb. 18, 2004

(51) Int. Cl.
*G06F 75/173* (2006.01)
*G06Q 40/00* (2006.01)

(52) U.S. Cl. .................. 709/238; 709/240; 705/40

(58) Field of Classification Search .............. None
See application file for complete search history.

(56) References Cited

U.S. PATENT DOCUMENTS

| | | | | |
|---|---|---|---|---|
| 5,483,445 A * | 1/1996 | Pickering | ............... | 705/40 |
| 5,835,856 A * | 11/1998 | Patel | ............... | 455/406 |
| 5,943,656 A * | 8/1999 | Crooks et al. | ............... | 705/30 |
| 6,035,285 A * | 3/2000 | Schlect et al. | ............... | 705/30 |
| 6,052,671 A * | 4/2000 | Crooks et al. | ............... | 705/34 |
| 6,321,078 B1 * | 11/2001 | Menelli et al. | ............... | 455/407 |
| 6,337,901 B1 * | 1/2002 | Rome et al. | ............... | 379/112.01 |
| 7,046,988 B2 * | 5/2006 | Kotzin | ............... | 455/406 |
| 7,107,039 B2 * | 9/2006 | Liao et al. | ............... | 455/406 |
| 7,392,035 B2 * | 6/2008 | Rahman et al. | ............... | 455/406 |
| 2001/0012346 A1 * | 8/2001 | Terry | ............... | 379/112.01 |
| 2002/0034285 A1 * | 3/2002 | Jarvi et al. | ............... | 379/114.01 |
| 2002/0091811 A1 * | 7/2002 | Schweitzer et al. | ............... | 709/223 |
| 2002/0116331 A1 * | 8/2002 | Cataline et al. | ............... | 705/39 |
| 2002/0143674 A1 * | 10/2002 | Beckman | ............... | 705/34 |
| 2002/0156732 A1 * | 10/2002 | Odijk et al. | ............... | 705/40 |
| 2002/0198830 A1 * | 12/2002 | Randell et al. | ............... | 705/40 |
| 2003/0074313 A1 * | 4/2003 | McConnell et al. | ............... | 705/40 |
| 2004/0015497 A1 * | 1/2004 | Swarna et al. | ............... | 707/6 |
| 2004/0028057 A1 * | 2/2004 | Benjamin et al. | ............... | 370/395.52 |
| 2005/0065880 A1 * | 3/2005 | Amato et al. | ............... | 705/40 |
| 2005/0114303 A1 * | 5/2005 | Barsness et al. | ............... | 707/3 |
| 2005/0138163 A1 * | 6/2005 | Schweitzer et al. | ............... | 709/223 |
| 2005/0246272 A1 * | 11/2005 | Kitada et al. | ............... | 705/40 |
| 2005/0255827 A1 * | 11/2005 | Foster et al. | ............... | 455/406 |

\* cited by examiner

*Primary Examiner*—F. Ryan Zeender
*Assistant Examiner*—Mussa Shaawat

(57) ABSTRACT

A system and method for performing normalization processing and mediation processing on data. The system and method thus allows a singular system, in particular a work engine, to process and store data from several sources and to perform a mediation process, wherein received data is processed to provide customer requested output, based on a reference table which contains a registry of data identifiers and the mediation processes to be performed on data corresponding to the data identifiers.

18 Claims, 4 Drawing Sheets

INVOICE MEDIATION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to a system for processing data. Specifically, the present system is capable of normalizing data and performing a data mediation process on the thus normalized data. In particular, the present system and method is capable of receiving data from several different sources, combining the data in a single platform and performing custom processes on the data based on a predetermined data definition structure.

BACKGROUND OF THE INVENTION

Billing processing systems sometimes must accommodate billing data from several different sources in order to execute a subsequent processing operation. This sometimes presents a problem because first, multiple originating systems may generate billing data that is not uniform across all of the originating systems, and second, any request for processing the billing data in order to output or create a secondary type of invoice using the received billing data requires tremendous customization on a case-by case basis. Accordingly, the process of extracting data from multiple different systems and subsequently performing customized data processes becomes inefficient and expensive.

SUMMARY OF THE INVENTION

The present disclosure describes a system that is capable of normalizing data that is received from several different sources, and performing a mediation process on the received data. Specifically, disclosed herein is a system and method for normalizing data from multiple sources so that they can be stored in a common database and performing a desired mediation process on data from the multiple sources on the basis of a mediation process registry wherein a mediation process to be performed on received data is registered.

In one aspect, a system for processing data is provided. In particular, the system comprises a mediation process manager communicatively linked to a reference table, wherein a data identifier and corresponding mediation process are registered in the reference table, and a processing unit for performing a mediation process on data on the basis of information registered in the reference table.

In another aspect, the processing unit of the system for processing data comprises a special handling controller and a workflow adjustment controller. Accordingly, the special handling controller controls mediation functions that perform mediation processes that require data that is readily available, and the workflow adjustment controller controls mediation functions that perform mediation processes that require a workflow adjustment to capture data required for performing a mediation process.

In another aspect, the system further comprises a mediation transform unit, wherein the mediation transform unit performs a transformation process on data in accordance with a predetermined defining structure before any of the special handling controller and the workflow adjustment controller perform a mediation process on the data. Further, in one embodiment, the predetermined defining structure is an XML schema and the mediation transform unit performs an XML transform.

In a further aspect, a method of performing a mediation process on data is provided wherein the method comprises registering a data identifier and a corresponding mediation process in a reference table, and performing a mediation process on data on the basis of information registered in the reference table.

In a further aspect, a method of processing data is provided. The method comprises the step of receiving data from multiple sources, normalizing the data such that data from different sources is reorganized into a format that accounts for commonalities as well as the unique features of the data from each respective source, and compiling the thus normalized data in a single storage device.

Further, in accordance with another aspect, the system and method of performing a normalization process and a mediation process performs processing on billing data.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

Exemplary embodiments are described herein with reference to the drawings, in which.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. Moreover, those skilled in the art will appreciate that many of elements and functional steps described herein can be implemented by any number of means including, discrete components or processors executing machine code, or any combination of the two. Furthermore, it is understood that the components and steps described herein can be substituted for, or omitted altogether in accordance with known customs and practices and the knowledge of those skilled in the art.

Figure 1:
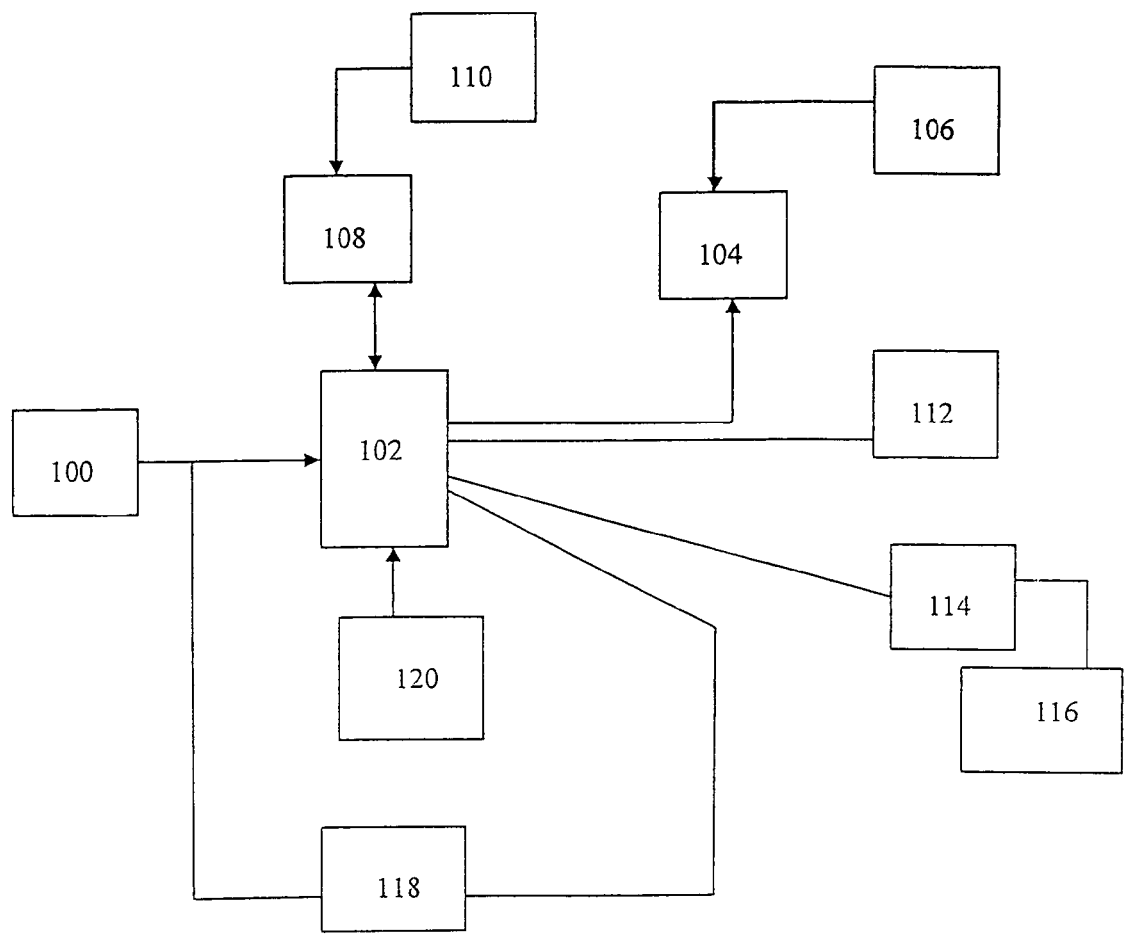
FIG. 1 is a drawing of an exemplary embodiment of the system.

FIG. 1 illustrates an embodiment of the present system. Illustrated are a data generation unit 100 and a mediation process manager 102. There is a mediation transform unit 104, which is coupled to a repository 106. Also provided is a special handling table 108, with a user interface 110, in communication with special handling table 108. A special handling function controller 112 is further provided along with a workflow adjustment controller 114, and as shown, the workflow adjustment controller is coupled to a storage device 116. Additionally, there is a direct data access controller 118 and a generic mediation controller 120.

Generally, the system illustrated in FIG. 1 is capable of normalizing data that is received from several different sources, and performing a mediation process on the received data. Normalization of data refers to reorganizing data files from several different sources into a format that accounts for the commonalities as well as unique features of the data from each respective source. This process allows for the combination of the data from the several different sources, so that the normalized data can be compiled in a single location, such as in a database or data store. Further, normalization of the data from the several different sources enables single systems to process the normalized data uniformly. For example, in an embodiment where the data received is billing or invoice data received from several different locations, such as customer billing or invoice information from one or more systems that generate invoices, the present system is capable of applying a level of commonality across invoice or bill data to the extent that that is possible, so that the data can be processed by a common system. The aspects of the present system dealing with normalization of data will be discussed in more detail with reference to FIGS. 2 and 3.

Normalization of data may further include breaking invoice data received from one or more sources down into a number of groupings or categories, for example, based on commonalities of data relative to the systems or businesses that the invoices are generated from. For example, where a company is in the telephone business and has multiple divisions, such as a local, long distance, and wireless divisions, the invoice data may be grouped or broken down according to the divisions, similarities of data, such as the particular customer, or a number of other ways which will readily suggest themselves to one skilled in the art. Data may be broken down and organized according to, for example, telecommunication categories, such as call detail record, or standard or applicable monthly charges. The data may also be broken down by document type, such as text records, headings, and other document related information. In the present embodiment, once the data has been normalized, the data may then be labeled and stored for subsequent use.

Mediation of data, or a mediation process, for purposes of this disclosure, refers to performing a specific, desired data processing function on data based on a need that is generally specified by the data source. For example, in the embodiment where the data received is billing or invoice data, and in particular, billing or invoice data from multiple customers, one customer may request the production of a secondary invoice using all, or some, of the billing or invoice data that is received. Specifically, whereas the billing or invoice data may be used primarily to create a bill cyclically, a customer may request the creation of a secondary invoice that tracks specific identified charges or tracks billing periods outside the normal billing period. The mediation process is thus the processing necessary to produce the requested information—a secondary invoice production. Accordingly, the present system automates the process of identifying the mediation process that should be performed on the received data, retrieving the data necessary to perform the mediation process, and performing the mediation process in order to produce the secondary invoice. This will be discussed in more detail below.

The mediation process may also refer to a continually running system, or component, such as a computer application or software, that monitors triggers to mediate data. For example, mediation process may monitor new bill data posted to determine whether the related data requires mediation based on information related to the data, such as a request by the customer for customized billing or reporting. The mediation process may generate mediated output including a new or combined invoice, new call detail records, adjustments to invoices, or information useful by the business for managing financial, marketing, and other aspects of the business.

Notably, the description of the present system will refer to billing and invoice data as the data type that is processed by the system. However, the present system is not limited to use for processing of invoice or billing data only. Specifically, any other data type can be processed, and the use of billing and invoice data is merely one potential exemplary embodiment.

Figure 2:
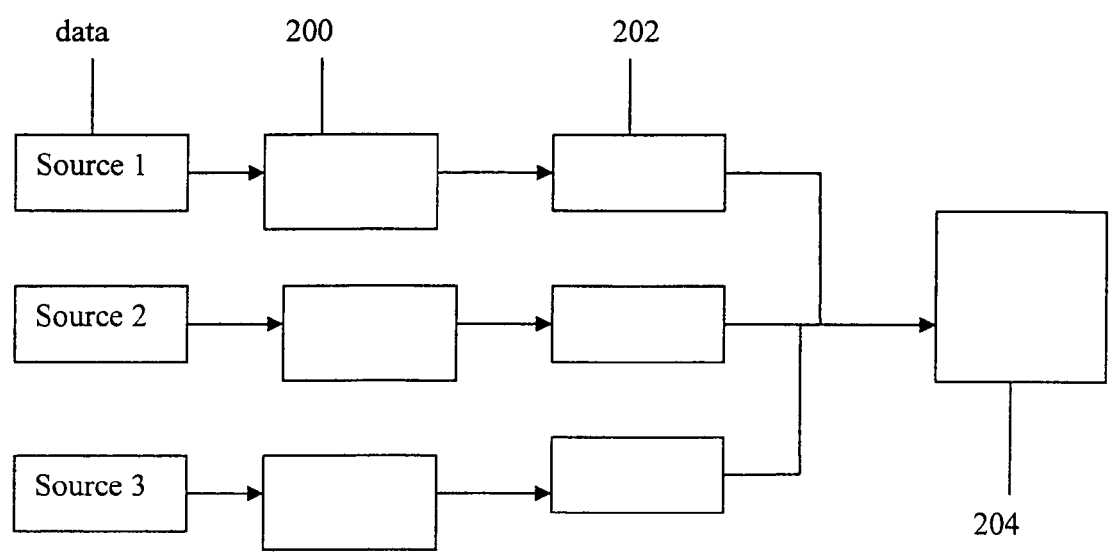
FIG. 2 is a detailed drawing of the data generation unit in accordance with the exemplary embodiment of the present system.

Referring back to the figures, FIG. 2 is a detailed presentation of data generation unit 100, shown in FIG. 1. As shown, data generation unit 100 includes a normalization unit 200, a data storage unit 202, and database 204. The operation of normalization unit 200, data storage unit 202 and database 204—data generation unit 100, will now be discussed with reference to the flow chart of FIG. 3, and where necessary, the structure of FIG. 2.

Figure 3:
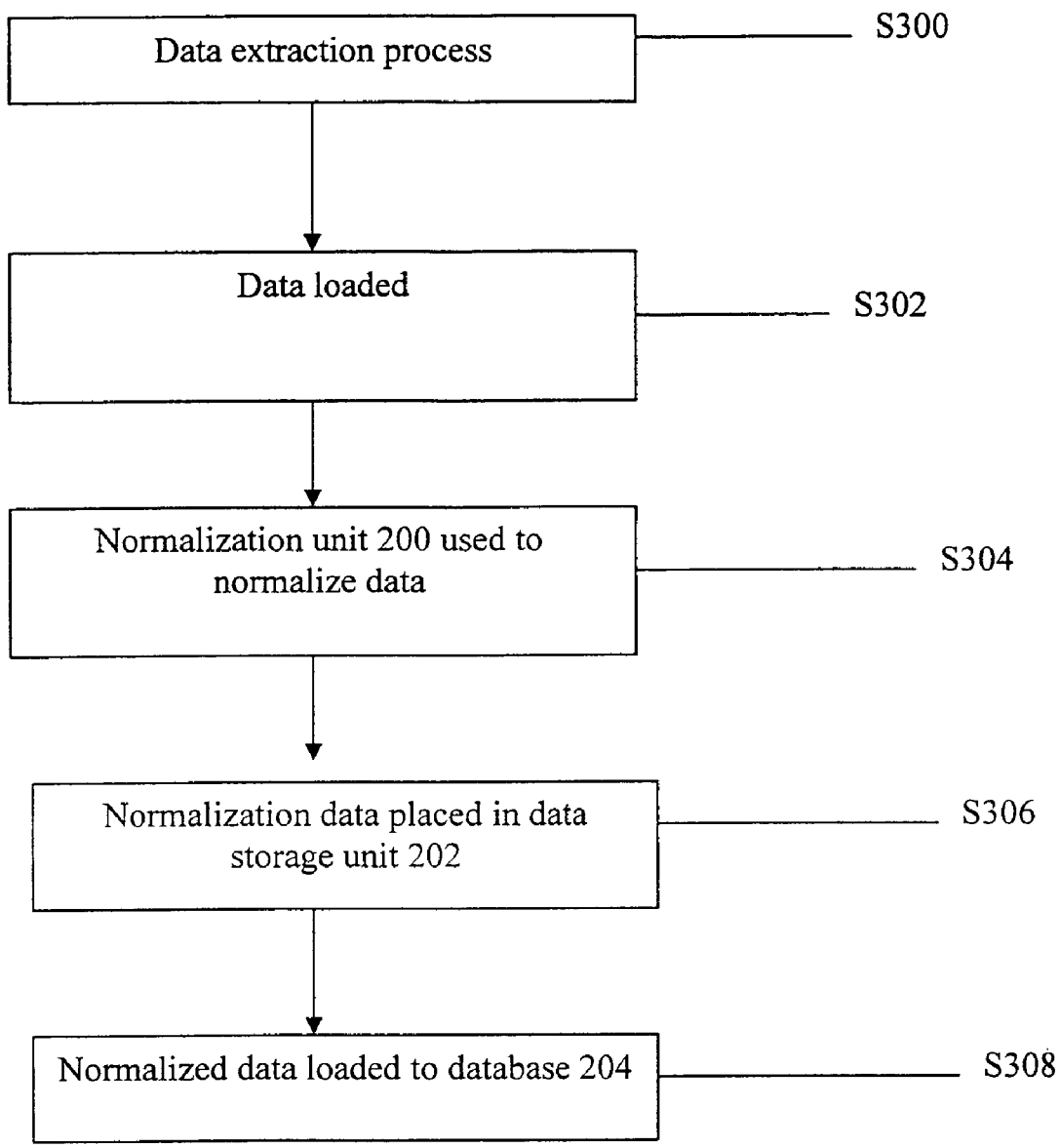
FIG. 3 is a flow chart which illustrates the operation of the data generation unit in the exemplary embodiment.

Referring to FIG. 3, at S300, data is extracted from a data source to a data file. Data can be extracted from a data source based on any predetermined arrangement. For example, in the embodiment wherein the data represents invoices or billing details from different sources, data may be extracted on a schedule corresponding to the cycle on which the billing or invoice data is generated. However, it is understood that this is only one embodiment, and it is contemplated that the present system can be used to perform normalization on any type of data in accordance with any extraction arrangement.

Further, as FIG. 2 shows, data can be extracted from multiple different sources. For example, source 1 may be one customer or division and source 2 may be another customer or division. Moreover, there is no requirement that the data be uniform across the several different sources. Accordingly, the normalization process described herein, with reference to FIG. 3, can be performed on data from several sources, including simultaneously on different data from different sources.

Referring back to FIG. 3, after data is extracted at S300, data is loaded to normalization unit 200, S302. Normalization unit 200 then normalizes the data, S304. During the normalization stage of the process, as discussed previously, data files are reorganized into a format that applies the level of commonality across the data from the different sources while still accounting for the unique aspects of data from each respective source. Thereafter, at S306, the thus normalized data from S304 is placed in data storage unit 202. The data is then loaded from data storage unit 202 to database 204, S308.

In one embodiment, database 204 is a short-term database. Thus, high-speed operation is more easily enabled because the volume of data is reduced. Further, in the embodiment where database 204 is a short-term database, database 204 can be coupled to a long-term storage device so that information in database 204 can be rolled over to a long-term storage device and archived in accordance with some predetermined schedule. For example, database 204 may be used to retain data for a specified period, and thereafter, data from database 204 corresponding to existing customers can be rolled over to a long-term storage device after the specified period expires. Such an arrangement is merely exemplary however, and alternative approaches could be employed.

In accordance with the normalization process described above, with reference to FIG. 3, the present system is capable of receiving data from several sources and sufficiently commonizing the data to enable storage of the normalized data in a single database. Moreover, the process captures much or all of the original data while still maintaining the unique aspects of the data.

Referring back to FIG. 1, the operation of the system will now be explained. In accordance with the present embodiment, the interaction and communication between the different entities of the system is managed by a middle layer, which functions based on certain rules for managing workflows and processes. Accordingly, in the following discussion of the present embodiment of the system, it is understood that the exchange of data between any of the entities of the system depicted in FIG. 1 is controlled and enabled by the message brokering middle layer. In one embodiment, for example, the middle layer may be a message-oriented middleware which provides program-to-program data exchange. The middleware may be implemented by any suitable means However, the present system is not limited the use of message-oriented middleware only, and other applications can be used as will be appreciated by those of ordinary skill in the art.

Mediation process manager 102 controls the mediation processing of the system. In particular, when triggered, the mediation process manager 102 determines the mediation process that is appropriate for data received from a particular source and invokes the function so that the correct mediation process is performed. In one embodiment, mediation process manager 102 and the message brokering middle layer previously discussed are housed on one common server. However, such a configuration is merely exemplary and in no way limits the present system.

Initially, the various types of mediation processes that can be performed on data from data generation unit 100 are registered to special handling table 108. Specifically, mediation processes are registered to correspond to identifiers, for example, a source identifier like a customer name or account number, so that when data corresponding to the identifier are received the appropriate mediation process or processes are identified and performed. Special handling table 108 is similar to a look-up table and may include an identifier that is registered therein along with the mediation process, or processes, to be performed on the data corresponding to the identifier.

Further, as shown, a user interface 110 in communication with special handling table 108 is provided. User interface 110 thus enables a user to access special handling table 108. For example, user interface 110 can be used to access special handling table 108 in order to enter or delete, to update information, or to request information output. For example, user interface 110 can be a web service, however, other alternatives can be used, as will be appreciated by those of ordinary skill in the art.

While special handling table 108 only identifies the mediation processes to be performed on data, some of the mediation functions which perform the mediation processes registered in special handling table 108 are actually stored such that they are available to special handling function controller 112. Specifically, mediation functions that simply require the manipulation of readily available data are stored such that they can be invoked and controlled by special handling function controller 112. The mediation functions can be provided as part of special handling table 108, or alternatively, stored so that they are accessible to special handling table 108. These arrangements are exemplary only, however, and alternative embodiments may also be employed as understood by those of skill in the art.

Still, other mediation functions are stored such that they are available to and controlled by workflow adjustment controller 114. Specifically, mediation functions which execute some form of workflow adjustment in order to execute a particular mediation process fall into this category. For example, a mediation process that requires the combination of data that are from a current time period and some future time period would require a mediation function which captures the current data, awaits the future data, captures the future data, then executes the combination processing. Such a mediation function is the type that would be available to workflow adjustment controller 114 such that it can be invoked by workflow adjustment controller 114. Further, as shown, workflow adjustment controller 114 is linked to storage device 116, which may be necessary to facilitate workflow adjustment processing. As stated above with reference to the special handling function controller 112, the mediation functions can be provided as part of workflow adjustment controller 114, or alternatively, stored so that they are accessible to workflow adjustment controller 114. However, as there, these arrangements are exemplary only and alternative embodiments may also be employed as understood by those of skill in the art.

In accordance with the illustrated embodiment of the present system, when mediation functions are invoked by special handling function controller 112 or by workflow adjustment controller 114, the data on which the mediation function will be performed must be retrieved. In the present embodiment, the data can be retrieved from data generation unit 100, and specifically, retrieved from database 204, directly, via direct data access controller 118 or after a transformation process is executed by mediation transform unit 104.

Direct data access controller 118 enables the direct extraction of data for a mediation process from data generation unit 100. This is particularly advantageous in applications where high speed is desired.

There is great deal of flexibility in how data is retrieved via direct data access controller 118. In particular, direct data access controller 118 may control the flow of data from data generation unit 100 to the calling mediation function based on a pre-registered, predetermined procedure that corresponds to the calling mediation function. Alternatively, the entity requesting data may provide specific instructions regarding the data to be extracted from data generation unit 100 each time a data request is made. Accordingly, data extraction via direct data access controller 118 can be effectuated in any number of ways, and the above description reflects one embodiment.

As previously discussed, data for mediation processing may also be retrieved via mediation transform unit 104. In particular, data required for the execution of a mediation function can be retrieved from data generation unit 100, transformed through a predetermined process, then directed to mediation transform unit 104. For example, in the case where the data from data generation unit 100 is invoice data, mediation transform unit 104 will retrieve the invoice data and return a transformed version of the data to the requesting function based on a standard transformation structure stored in repository 106. For example, a standard XML schema is stored in repository 106, and invoice data retrieved from data generation unit 100 is defined in XML using the standard schema, and then returned to the requesting function. The standard XML schema stored in repository 106 would thus be used to define all invoices across all the different sources of invoice data so that the single schema stored in repository 106 can be used for XML transformations on all invoice data. The transformed version of the retrieved data could then be relayed to special handling function controller 112, which can then perform the mediation function using the transformed version of the data.

Alternatively, in one embodiment, several XML schemas can be stored in repository 106, for example, one for each source of invoice data. Accordingly, when data is retrieved from data generation unit 100, mediation transform unit 104 can perform a XML transformation process on the data based on the source of the data. Furthermore, one embodiment may include a repository 106 with both a standard schema, as described above, and several other schemas—one for each source of invoice data available to mediation transform unit 104. Mediation transform unit 104 could then be equipped to select the appropriate schema for a particular transformation process. As will be understood, however, the use of XML and an XML schema, including how many XML schemas are to be used for the transformation process, is for exemplary purposes only and any other suitable application or structure can be used.

Generic mediation controller 120 houses all of the mediation rules that apply to mediation process manager 102. For example, the transformation process that is performed on data that is retrieved from data generation unit 100, described above, may have certain universal rules that must be followed in the transformation of all data. Specifically, the types of rules that govern all of the mediation processes, including transformation processes, are housed in generic mediation controller.

Figure 4:
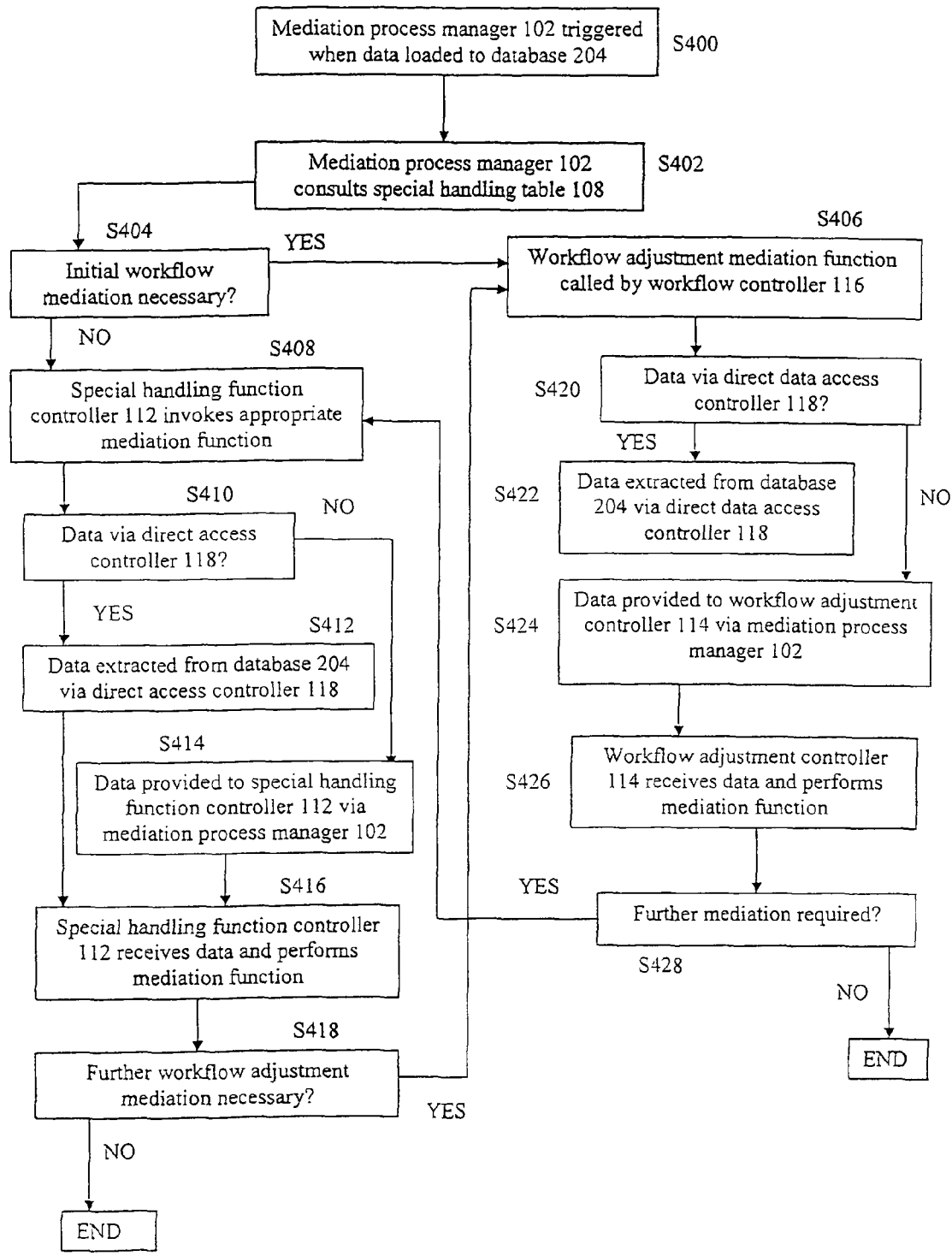
FIG. 4 is a flow chart which illustrates the operation of the overall system according to the exemplary embodiment.

The operation of the system of FIG. 1 will now be described with reference to the flow chart of FIG. 4. At S400, mediation process manager 102 is triggered whenever data is loaded to short term database 204, FIG. 2, of the data generation unit 100. Additionally, a data identifier corresponding to the data that was loaded to short term database 204 is conveyed to mediation process manager 102. For example, as stated previously, the data identifier can be a customer identification, like a name or an account number.

At S402, mediation process manager 102 consults special handling table 108 to determine the mediation process, or processes, if any, that are registered to the customer or account corresponding to the data identifier. Specifically, as explained previously, special handling table 108 contains an identifier-to-mediation process map such that for each data identifier there is a list of mediation processes to be performed on the data corresponding to that data identifier.

At S404, it is determined whether or not special handling table 108 calls for an initial workflow adjustment mediation process. If special handling table 108 does call for a initial workflow adjustment mediation process, i.e., YES at S404, the process moves to S406, where workflow adjustment controller 114 invokes the workflow adjustment mediation function that is registered in special handling table 108. Specifically, at S406, mediation process manager 102 directs workflow adjustment controller 114 to perform the workflow adjustment mediation function that is registered in special handling table 108.

On the other hand, if it is determined that an initial workflow adjustment is not necessary, i.e., NO at S404, the process then goes to S408 where special handling function controller 112 invokes the appropriate mediation function based on the information registered in special handling table 108. Thereafter, the data on which mediation process will be performed that was loaded to short term database 204, for example, invoice or bill data, is extracted so that the appropriate mediation function can be performed on the data. Specifically, at S410 the process determines whether the mediation function invoked requires data directly from short-term database 204 via direct data access controller 118. In the event that the mediation function does require data directly from short term database 204 via storage direct data access controller 118, i.e., YES at S410, a data extraction process is executed to extract the data from database 204 and make the data available to special handling function controller 112 via direct data access controller 118, S412.

In accordance with one embodiment, direct data access controller 118 can be used to perform any number of preliminary processing on data before it is sent to special handling function controller 112. For example, direct data access controller 118 can extract all of the data from the relevant data file, or alternatively, direct data access controller 118 can extract only relevant portions of data. It is further contemplated that direct data access controller 118 includes a reference table, wherein specific processes to be performed on data extracted from database 204 can be registered. Accordingly, direct data access controller 118 can perform processing on data before it is routed to special handling function controller 112 in accordance with the process registered in the reference table.

In the case where the mediation function invoked at S408 does not require data via direct data access controller 118, i.e., NO at S410, processing proceeds to S414. At S414, data from database 204 is provided to mediation process manager 102. During this step, a generic transformation process is performed on the data that is extracted from database 204. Specifically, as discussed previously, in accordance with transformation rules stored in repository 106, mediation transform unit 104 performs a standard transformation process on data that is extracted from database 204. The thus transformed data is then directed to special handling function controller 112.

At S416, special handling function controller 112, receives the data after the transformation process is performed by mediation transform unit 104, and performs the special handling mediation function identified in special handling table 108.

Thereafter, at S418, a determination of whether further workflow adjustment mediation is necessary. If a workflow adjustment mediation is necessary, the process proceeds to S406. If no workflow adjustment mediation is necessary, the process ends.

Referring back to S404, after workflow controller is invoked at S406, at S420 a determination is made as to whether data should be extracted via direct data access controller 118. If the workflow function that is invoked requires that data be extracted from database 204 via direct data access controller 118, i.e., YES at S420, the process proceeds to S422 where data is extracted from database 204 and directed to workflow adjustment controller 114 via direct data access controller 118. If the workflow function that is invoked does not require that data be extracted via direct data access controller 118, i.e., NO at S420, the process proceeds to S424 where data is extracted from database 204 and provided to workflow adjustment controller 114 after mediation transform unit performs a standard transformation process is performed on the data. At S426, the workflow adjustment mediation function is performed on the data. Thereafter, at S428 a determination of whether or not further mediation processing is required is processed. If further mediation processing is required, i.e., YES at S428, the process proceeds to S408 for further mediation processing. If NO at S428 the process ends.

While several embodiments have been provided in the present disclosure, it should be understood that the present system may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A method for performing a mediation process on invoice data, the method comprising:
   registering, with a mediation process manager stored in a computer readable storage media and executed by a processor, a plurality of data identifiers and a plurality of mediation processes in a reference table stored in a computer readable storage media, wherein each of the plurality of data identifiers is registered to correspond to at least one of the plurality of mediation processes, and wherein each of the plurality of mediation processes performs a different data processing function;
   retrieving, with a mediation transform unit stored in a computer readable media and executed by a processor, invoice data from one or more data sources stored in a computer readable storage media, the invoice data corresponds to one of the plurality of data identifiers;
   identifying, with the mediation process manager, the at least one of the plurality of mediation processes to perform on the invoice data by determining that the at least one of the plurality of mediation processes are registered in the reference table to correspond with the one of the plurality of data identifiers that corresponds to the invoice data; and
   performing the at least one of the plurality of mediation processes on the invoice data to generate a mediated output, wherein the mediated output is different from the invoice data, wherein performing the at least one of the plurality of mediation processes on the invoice data includes performing the at least one of the plurality of mediation processes with at least one of a special handling function and a workflow adjustment function on the invoice data, wherein a workflow adjustment controller performs the workflow adjustment function on the invoice data, and wherein the workflow adjustment function comprises capturing current invoice data, awaiting future invoice data, capturing the future invoice data, and processing the current invoice data and future invoice data.

2. The method of claim 1, wherein each data identifier identifies a data source and the corresponding mediation process relates to the mediation process to be performed on data from that data source.

3. The method of claim 2, wherein the invoice data is billing data.

4. The method of claim 1, further comprising performing a data transformation process in accordance with a predetermined defining structure before performing any of the special handling function and the workflow adjustment function on the invoice data.

5. The method of claim 4, wherein the predetermined defining structure is an Extensible Markup Language schema.

6. The method of claim 5 further comprising retrieving data directly from a data generation unit via a direct data access controller, wherein at least one of the special handling function and the workflow adjustment function is performed on the invoice data.

7. The method of claim 1, wherein the mediated output is further defined as a mediated invoice.

8. The method of claim 1, wherein the invoices are further defined as telephone bills and wherein the mediated output includes a portion of the call details from the telephone bill.

9. The method of claim 1, wherein performing the at least one of the plurality of mediation processes on the invoice data further comprises:
   providing a first billing system that generates a first invoice; and
   providing a second billing system that generates a second invoice such that the mediated output is based on at least portions of the first and second invoices.

10. The method of claim 1, wherein a special handling function controller performs the special handling function on the invoice data.

11. The method of claim 10, wherein the special handling function controller invokes the special handling function based on information registered in the reference table.

12. The method of claim 10, wherein the special handling function comprises manipulating data.

13. The method of claim 1, wherein the workflow adjustment controller invokes the workflow adjustment function based on information registered in the reference table.

14. The method of claim 4, wherein the mediation transform unit performs the data transformation process.

15. The method of claim 1, wherein the reference table is coupled to a user interface.

16. The method of claim 1, wherein the plurality of mediation processes comprise data transformation, data manipulation, and delayed data processing.

17. The method of claim 1, further comprising:
   retrieving, with the mediation transform unit, a second invoice data from one or more data sources stored in a computer readable storage media, the second invoice data corresponds to a second one of the plurality of data identifiers;
   identifying, with the mediation process manager, the at least one of the plurality of mediation processes to perform on the second invoice data by determining that the at least one of the plurality of mediation processes are registered in the reference table to correspond with the second one of the plurality of data identifiers that corresponds to the second invoice data; and performing the at least one of the plurality of mediation processes on the second invoice data to generate a second mediated output, wherein the second mediated output is different from the second invoice data, and wherein the at least one of the plurality of mediation processes performed on the second invoice data to generate the second mediated output is different from the at least one of the plurality of mediation processes performed on the invoice data to generate the mediated output.

18. The method of claim 17, further comprising:

retrieving, with the mediation transform unit, a third invoice data from one or more data sources stored in a computer readable storage media, the third invoice data corresponds to a third one of the plurality of data identifiers;

identifying, with the mediation process manager, the at least one of the plurality of mediation processes to perform on the third invoice data by determining that the at least one of the plurality of mediation processes are registered in the reference table to correspond with the third one of the plurality of data identifiers that corresponds to the third invoice data; and performing the at least one of the plurality of mediation processes on the third invoice data to generate a third mediated output, wherein the third mediated output is different from the third invoice data, and wherein the at least one of the plurality of mediation processes performed on the third invoice data to generate the third mediated output is different from the at least one of the plurality of mediation processes performed on the second invoice data to generate the second mediated output and the at least one of the plurality of mediation processes performed on the invoice data to generate the mediated output.

* * * * *